C. R. UNDERHILL.
GEAR SHIFTING MECHANISM.
APPLICATION FILED NOV. 26, 1913.

1,115,877.

Patented Nov. 3, 1914.

Witnesses:
Chas. W. King.
Rose Eisenstadt

Inventor:
Charles R. Underhill,
by
Attorney.

C. R. UNDERHILL.
GEAR SHIFTING MECHANISM.
APPLICATION FILED NOV. 26, 1913.

1,115,877.

Patented Nov. 3, 1914.
2 SHEETS—SHEET 2.

Witnesses:
Chas. D. King.
Rose Eisenstadt

Inventor:
Charles R. Underhill,
by
Attorney.

UNITED STATES PATENT OFFICE.

CHARLES R. UNDERHILL, OF NEW HAVEN, CONNECTICUT.

GEAR-SHIFTING MECHANISM.

1,115,877.

Specification of Letters Patent.

Patented Nov. 3, 1914.

Application filed November 26, 1913. Serial No. 803,113.

*To all whom it may concern:*

Be it known that I, CHARLES R. UNDERHILL, a citizen of the United States, and a resident of New Haven, in the county of New Haven and State of Connecticut, have invented certain new and useful Improvements in Gear-Shifting Mechanism, of which the following is a specification.

This invention relates to gear-shifting mechanism, and especially to an apparatus of this type for use on motor-cars, motor-trucks, etc., and the principal object of the invention is to provide a type of mechanism operable with a minimum expenditure of power for use wherever the shifting of gears to change speed is required.

In gear-shifting mechanism as generally employed on motor vehicles it is customary to bring about the necessary shifting movements of the gears in changing from one speed to another by the expenditure of electrical energy or energy in a different form operating in an equivalent manner. In such mechanisms as heretofore used there has been a great waste of energy in performing the necessary gear-shifting movements. In electrical gear-shifting mechanism as heretofore constructed these losses are due to several conditions. One of these is that when an electric circuit for energizing a gear-shifting solenoid or other electrical device is closed time is required for the current to build up and additional time is required to get in motion the mass to be moved. After this additional time, and frequently a very great amount of time, elapses before the gears to be connected go into mesh with each other, owing to the different speeds at which these gears are moving. All of these conditions, when the circuit is closed and current on, result in the waste of electrical energy and consequent early exhaustion of the battery or other source of energy. A similar waste occurs when pneumatic, hydraulic, or other equivalent form of energy is similarly employed for performing the gear-shifting operations.

In a companion application filed by me November 19, 1913, Serial No. 801,789, I have disclosed in a gear-shifting mechanism as a substitute for an electric, pneumatic, hydraulic, or other equivalent power device for performing the actual work of shifting parts to change from one speed to another, an operating power device of such a character that its use results in a very considerable saving of energy in shifting a part or parts to change from one speed to another. In that application the power device used is quick-acting, is one in which the energy expended is employed to move the load, and no energy is expended while the gears to be brought into mesh are in contact but not in mesh, and in which none is wasted in the building up of an electric current or any equivalent thereof. A spring of proper type fulfils these requirements and is illustrated in said companion application as the preferred means employed for performing the work of effecting the necessary gear-shifting movements without waste of the energy of such operating power device. This spring of my companion application exerts its maximum effort at the beginning of the gear-shifting operation at which time a considerable amount of energy and time is required to start the movement of the mass to be shifted, and after that the power of the spring gradually diminishes. Its action is substantially the reverse of that of an electrically-operated device which when energized exerts its minimum effort at the start and has its power rapidly increased thereafter as the current builds up and the electrical device is more and more strongly energized. The apparatus of the present invention is similar to that of my aforesaid companion application in that operating power devices of the type just described are employed in the present case as in the other. In said application I have also disclosed a relatively short power circuit including a suitable electrical device for energizing the operating power device or spring just referred to, and in addition to this power circuit there is also a controlling circuit made of relatively fine wire and requiring but a small amount of energy for bringing about the desired controlling action. Each of these circuits requires to be closed but a relatively short period of time for energizing the operating power device or permitting its release, as the case may be; and in these respects also the apparatus of the present application is similar to that aforesaid. In various other respects also, such as the inter-relation of the power and controlling circuits so that each will normally have an automatically controlled break, the control of these gaps by the automatic action of the electrical device energized by the power circuit, etc., the apparatus of the present application is similar to that of my aforesaid companion application. In said companion application, however, there is disclosed an apparatus in which all of the various necessary gear-shifting movements are derived from a single energizing power device acting upon a single operating power device or spring, which energizing and operating power devices are in turn energized by or under the control of a single power circuit and controlling circuit respectively, the construction being such that a single energizing and controlling unit governs the selection of each desired gear-shifting movement, and also effects that movement.

The apparatus of the present application is distinguished from that of my companion application chiefly in that different gear-shifting movements are controlled and brought about by different controlling and power devices governed and energized by individual circuits, or rather, by individual branches of one main controlling circuit and one main power circuit, the construction being such that the devices of any unit may be brought into action without affecting the controlling, energizing or operating devices of any other unit. A further difference resulting from the employment of electrically-controlled or operated devices substantially throughout is that there is always the response to a controlling or operating action that should follow in a circuit having few and light mechanical parts to move.

Other features of the invention not hereinbefore referred to will be hereinafter described and claimed and are illustrated in the accompanying drawings, in which—

Similar characters designate like parts in all the figures of the drawings.

In carrying my present invention into effect I may, as in my companion application aforesaid, make use of any well-known or suitable type of gearing capable of being shifted to different positions corresponding to the various positions or speeds in or for which such gearing may be set. The gearing shown is a well-known type and is suitable for the purpose.

As the active or operating means for performing the principal gear-shifting functions I prefer to employ actuators in the form of springs energized by suitable electrical devices, such as solenoids, each operating power device or spring preferably being normally in condition for performing its gear-shifting function. The preferred operating power device is one in which the power is not only normally ready for use, but is one in which the potential energy of the device while available for substantially instantaneous release is normally under restraint. The energizing power device employed in connection with this operating power device for the purpose of storing energy in said operating device is preferably an electrical device or solenoid energized by current in a suitable power circuit, this electrical device or solenoid serving as a power-supplying means to put the operating device or spring under compression, in which condition it will be held until its work is to be performed, when the spring, which constitutes here the power-applying means, will be released and its potential energy will become instantaneously kinetic and will shift a gear substantially instantaneously to a new position.

Figure 1:
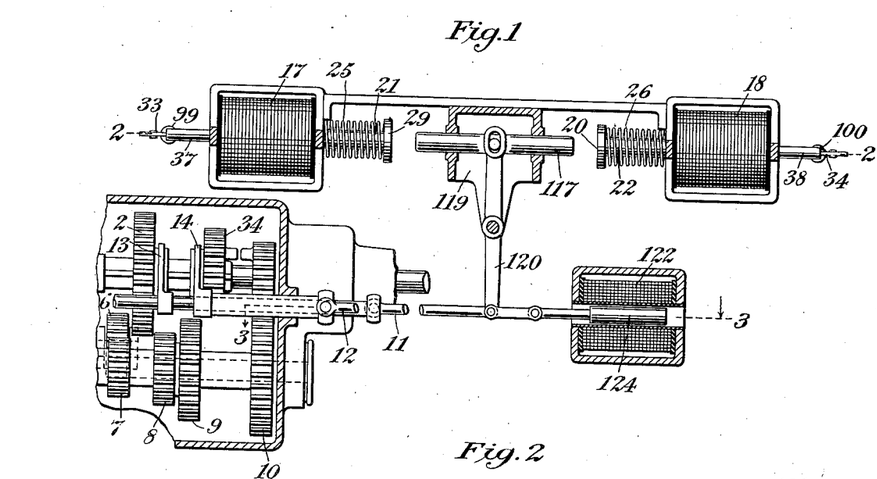
Figure 1 is a sectional elevation, substantially in line 1—1 of Fig. 2, of a portion of a type of gear-shifting mechanism having separate energizing and operating power devices and circuits governing different gear-shifting movements, and illustrating one embodiment of my present invention.
Figure 2:
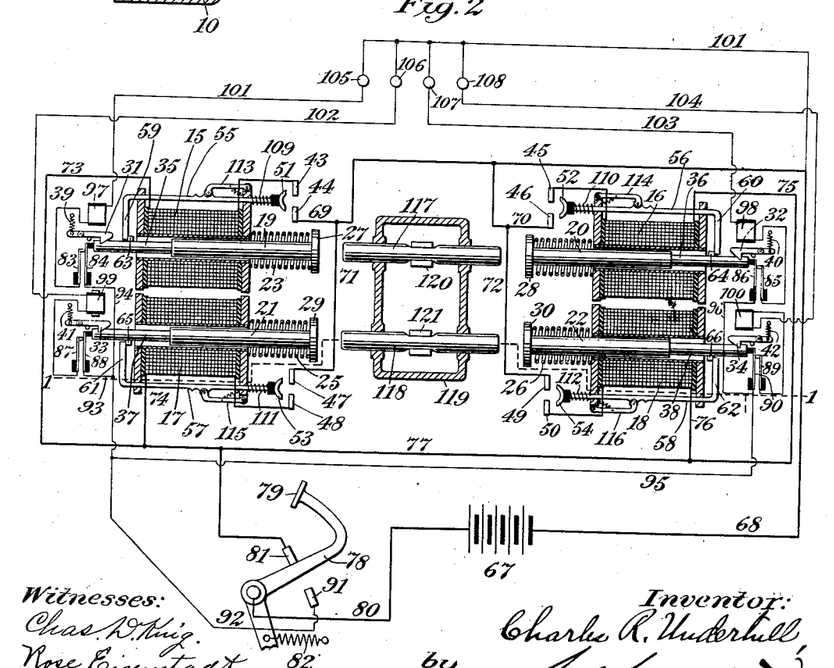
Fig. 2 is a sectional plan and diagrammatic view of said gear-shifting mechanism, the section being taken in line 2—2, Fig. 1.

In Fig. 1 I have shown a well-known type of change-speed gearing in which the respective gears are indicated at 2, 3, 4, 6, 7, 8, 9 and 10. These gears and their movements are under the control of suitable gear-shifting mechanism the principal mechanical elements of which, as illustrated herein, are a pair of gear-shifters or shifter-rods, 11 and 12, carrying the usual shifter-arms, 13 and 14. Each of these gear-shifters or shifter-rods is movable to three positions, one of which is its neutral position in which the gears controlled by it are out of mesh, and the other two are active positions corresponding to different speeds or directions of speed, as the case may be. In the present case, in the construction shown in Figs. 1 to 5 inclusive, each of these gear-shifting movements to working positions or to neutral position is intended to be effected by a different actuator instead of all of them being effected by a single actuator as in my aforesaid companion application. In the embodiment of the invention illustrated in these first five views each of the movements of the gear-shifting mechanism to a working position is illustrated as derived from a different energizing power device in the form of a solenoid, the four solenoids shown being designated respectively by 15, 16, 17 and 18, and their cores or plungers by 19, 20, 21 and 22. The pull of these plungers when energized serves to put under compression springs, such as 23, 24, 25 and 26, each of which is located between a collar, 27, 28, 29 or 30, at the outer end of its respective plunger and the frame or case of its individual solenoid. On each energization of any one of these solenoids its plunger is drawn in to the limit of its stroke and the corresponding spring consequently is compressed at such time to its maximum extent. In this position the spring is intended to be held until released for the purpose of shifting a gear to the new position. Any suitable means may be employed for the purpose of holding each spring energized, that is, under compression. Here I have shown spring-held latches, such as 31, 32, 33 and 34, the nose of each of which is adapted to engage in a corresponding notch in a rod, 35, 36, 37 or 38, forming an extension of the corresponding plunger 19, 20, 21 or 22, but made of non-magnetic material. When any one of these plungers is drawn in to the limit of its in-stroke its latch will be pressed into the notch by a suitable spring, such as 39, 40, 41 or 42, and the plunger and its extension, together with the spring, 23, 24, 25 or 26, as the case may be, will be held under restraint until released and will maintain said spring in condition for instantaneous release of its stored energy when its latch is withdrawn from the aforesaid notch. When so withdrawn the energized operating power device or spring will instantaneously move the corresponding plunger and its extension inward, as shown in Figs. 1 and 2, which movement will serve through suitable power-transmitting connections to shift the corresponding gear of the speed gearing to a new position to bring about a change in speed. Here the movement of each solenoid-plunger is transmitted to a reciprocating member or rod suitably connected to other power transmitting elements, the operation of which will be hereinafter described.

The solenoids 15—18 are here connected in a single power circuit in such a manner that each of the solenoids may be separately energized momentarily, that is to say, just long enough to perform the operation of energizing the corresponding operating power device or spring. Immediately after this the circuit of said solenoid should be broken, and in this case it is intended to remain interrupted until the completion of a cycle of operations of the energizing and operating power devices governed by it, after which the circuit of said solenoid may be closed again. Each solenoid is here employed as the means for deënergizing itself, it serving, as in my aforesaid companion application, to operate a switch for opening a gap in the circuit through such solenoid. These gaps are shown as four in number, one for each of the solenoids 15—18, they being located herein at the respective pairs of contacts, 43—44, 45—46, 47—48, and 49—50, which are adapted to be spanned by bridging contacts, such as 51—54, operated directly by the extended ends of the plungers of said solenoids. Each bridging contact 51—54 is illustrated as carried by a switch-rod, 55—58, though insulated therefrom, as shown, each of said switch-rods or slides being mounted in guides in the casings of the respective solenoids and having near its outer end a projection in the path of an actuator or projection on the extended end of the corresponding solenoid-plunger. These projections from the switch-rods are designated respectively by 59—62, and coact with projections, 63—66, on the extensions of the solenoid-plungers. The parts are so combined that at about the end of the in-stroke of each plunger the projection thereon will strike that of the corresponding switch-rod and shift said rod outward in Fig. 2, thereby opening up the power circuit and the gap controlled by the bridging contact, which gap is intended to be normally closed.

Owing to the fact that I employ in the present case a plurality of solenoids and a plurality of parts operated or controlled thereby, instead of a single set of these devices, as shown in my aforesaid companion application, the electrical units in the present case are preferably electrically connected in multiple, the solenoids 15—18 being connected respectively in parallel branches of a single main power circuit, while suitable controlling devices for releasing the operating power devices energized by said solenoids will preferably be connected in parallel branches of a single main controlling circuit. The main power circuit illustrated herein is from a suitable source of energy, 67, through a common conductor, 68, by way of four parallel branch conductors, 69, 70, 71 and 72 to the respective pairs of contacts 43—44, 45—46, 47—48 and 49—50, whence four parallel branch conductors pass to corresponding ends of the solenoids 15—18, the opposite ends of which are connected in turn by four parallel branch conductors, 73—76, to a common conductor, 77, leading from the other side of source of energy 67. The power circuit also has in the main circuit thereof, as in my companion application, a circuit-controller, such as 78, operated by the pedal, 79, of the clutch-lever and connected by a conductor, 80, to said other side of the source of energy, the common conductor 77 being connected to a contact, 81, governed by said circuit-controller. Thus, as in my companion application, here also there are two breaks in the power circuit of each solenoid 15—18, one of which breaks is at a point governed by a bridging contact, as before described, this break being controlled, as set forth, by an automatic circuit-controller or switch. So far as the intermittent energization and deënergization of each solenoid is concerned, the break at such bridging contact is sufficient for the proper operation of the apparatus. As a matter of convenience, however, a second break is shown, which break may be employed in connection with motor vehicles or other apparatus when desired. This second break is, as just stated, common to all of the parallel branch circuits of the four solenoids 15—18 and is preferably normally closed by a power device. A suitable power device for the purpose is the usual spring, 82, by means of which the clutch-lever is held retracted.

It will be clear from the foregoing that whether the second gap just described is used or not the circuit at that point will always normally be closed, so that current will flow momentarily through any one of the solenoids 15—18 when the other break (before described) in the branch circuit of that solenoid is closed. In this specific embodiment of the invention the second gap is automatically maintained closed by power and manual action is required to open it.

As before indicated, the release of the potential energy of each operating power device or spring 23—26 is governed in this case by a single controlling electrical circuit. This controlling circuit, like the power circuit, is intended to be economical of current and only momentarily closed, but it is unlike the power circuit in that it is normally open, there being here, as shown in Fig. 2, four parallel branches of this controlling circuit, each branch controlling a different one of the solenoids 15—18 and each of said branches being normally open. The current for the controlling circuit may be derived from the same source as the current for the power circuit, but the controlling circuit will preferably consist mainly of fine wire conductors and will utilize but little of the current of the source of energy in controlling the operation of the gear-shifting mechanism. Each controlling circuit for governing one of said solenoids must have at least one break (and need have but one for the purpose of controlling the maintenance of the necessary sequence of operations of its unit of the mechanism) this break being similar to that at the bridging contact in each branch of the power circuit in that it is a break automatically closed and opened intermittently through the action of one of the solenoids specified. Unlike said break at the bridging contact in the power circuit branch, however, this break in the controlling circuit is normally open and is intended to be closed only at the end of the in-stroke of the plunger of the corresponding solenoid and while said plunger and the operating device energized by the movement thereof are held under restraint. In the specific apparatus illustrated there are four controlling branches of this controlling circuit, one for each solenoid 15—18 and each of these branches is normally open, the normally open break therein being that just referred to as the one necessary break in the controlling circuit of each solenoid. In Fig. 2 these four breaks are shown as between pairs of contacts, 83—84, 85—86, 87—88 and 89—90. In each of these pairs of contacts the inner and longer one is shown as in position to be engaged by the end of the extension of the corresponding solenoid-plunger and brought into engagement with the outer and shorter contact of such pair substantially at the moment that said plunger reaches the end of its in-stroke. In all other positions of each plunger the gap between the contacts of the pair corresponding thereto will be open. Each of these pairs of contacts is illustrated here as connected in a circuit with the source of energy 67 supplying current to the power circuit. The controlling circuit through each of these pairs of contacts is also illustrated as having an additional break or breaks which is or are provided for determining the times when the devices controlled thereby shall go through their sequence of operations, but which have no control over the time or sequence of operations of any cycle after such cycle is begun. Here there are two breaks in the controlling circuit through each of the pairs of contacts 83—84, etc., in addition to that at said contacts. One of these additional breaks is in the main line of the controlling circuit and is at the circuit-controller 78 governed by the foot-lever or clutch-lever, and is a break that is intended to be manually closed by the depression of said clutch-lever. The contact with which said clutch-lever coöperates to control this second break in the controlling circuit of each solenoid 15—18 is indicated at 91. Said contact is shown as connected to a main line conductor, 92, branches from which lead to the respective contacts 88, 84, 90 and 86, as shown at 93, 94, 95 and 96. In part the controlling circuit follows the same course as the power circuit, viz., through conductor 80, source of energy 67, and conductor 68. From said conductor 68, however, branches pass to the outer short contacts 83, 85, 87 and 89 of the pairs of contacts previously described. Each of these branches embodies as its principal controlling element means, such as a small electromagnet, 97, 98, 99 or 100, for releasing the corresponding latch 31, 32, 33 or 34, to set free the potential energy of the operating power device or spring controlled thereby. Each parallel branch of the controlling circuit is shown as completed by fine wire conductors extending from the heavier conductor 68 through one of the controlling electromagnets 97—100 to the corresponding contacts 83, etc., said conductors being designated respectively by 101, 102, 103 and 104. Each of these branch circuits is also shown as having therein a manual controller or push-button, such as 105—108, which may be interlocking, by means of which each branch of the controlling circuit may be closed independently of every other. On the closing of a branch circuit by any one of these push-buttons the corresponding latch will be released by the controlling electromagnet in that branch in a manner which will be obvious. As soon as such latch is released the gap at the corresponding one of the four sets of contacts 83—84, etc., will be automatically opened and the corresponding solenoid-plunger will be quickly thrown to the end of its out-stroke by the operating power device or spring surrounding it. The gap thus opened in the branch circuit will remain open until said plunger reaches the end of its in-stroke again, and hence the controlling branch circuit after being once closed and its controlling electromagnet once energized to release the corresponding latch cannot be closed again until the solenoid corresponding thereto is again energized by the power circuit and the operating power device or spring again energized by said solenoid.

The push-buttons 105—108 which are preferably located on the steering-head of the vehicle, constitute, as will be obvious, a means for controlling, and manually, a third break in each controlling circuit that may be established through the connections shown in Fig. 2. Thus, each such circuit that may be established has in it three breaks all of which are normally open and two of which are controlled by power-operated devices, one in the main line of the controlling circuit and the other in an individual parallel branch of the controlling circuit, and automatically opened and closed by the action of a solenoid corresponding to that branch.

It will be seen from the foregoing that each of the power circuits before described that may be established through the main line and the branch of such power circuit is quite short and that the solenoid, the source of energy and the automatic switch constituting the principal means for making and breaking each such circuit may be quite close together and that the drop in any power circuit so closed will be slight. Moreover, as each branch is only momentarily closed, each being broken practically instantaneously after being made, the draft upon the battery will be maintained for the minimum amount of time. In addition, during each brief period that a controlling circuit is established through one of the parallel branches described but little current is used in it owing to the employment of a fine wire conductor through the major portion of that circuit.

The parts described for operating each bridging contact to open and close one of the gaps at 43—44, etc., and for operating one of the long contacts 84, etc., to close and open automatically the respective gaps in the parallel branches of the controlling circuit, constitute double-throw switches governed by the solenoids 15—18 and operated in such a manner that each switch will alternately and substantially reciprocally open and close two gaps one in the power-circuit branch and the other in the corresponding controlling-circuit branch, and one on one stroke and the other on the opposite stroke of the corresponding solenoid-plunger, from which it will be clear that there can be no interference with the predetermined sequence of operations of the mechanism controlled and operated by any pair of corresponding branch circuits. On the in-stroke of a solenoid-plunger the corresponding spring will be compressed and latched and the break in the corresponding power-circuit branch then opened and that in the corresponding controlling-circuit branch then closed, and on the release of the corresponding latch and the outward movement of said plunger the gap in said controlling branch will be opened, and at the end of the out-stroke the gap in the power branch will be closed; and this regardless of the manner in which the circuit-controller governed by the clutch-lever is operated with respect to the contacts 81 and 91 of the main line portions of the power and controlling circuits, and irrespective also of the order in which the push-buttons 105, etc., may be operated.

The projections from the switch-rods, 55, etc. and the extensions 35, etc., of the solenoid-plungers are sufficient for the purpose of automatically opening the breaks in the branches of the power circuit, as before described. These breaks may be closed at the proper time in any suitable manner, coil springs 109—112 being shown herein for this purpose. These springs are interposed between suitable stop-faces on the switch-rods 55, etc., and adjacent portions of the solenoid casings and are of sufficient strength to return said switch-rods normally to the circuit closing position in which each pair of contacts 43—44, etc., is closed by the corresponding bridging contact, and to do this in opposition to the action of a light detent for holding the switch-rod in either of its two extreme positions, suitable spring-pressed roller-detents being shown at 113—116, for this purpose, the switch-rods each having two notches as illustrated in Fig. 2 in either of which the roller of the detent may drop. It will be obvious from Fig. 2 that near the end of the in-stroke of each plunger the switch-rod is moved mechanically by the projection from the extension of the plunger and the coiled spring surrounding the switch-rod put under compression, while on the release of the corresponding latch, the return of the plunger to the end of its out-stroke by the spring surrounding it and the withdrawal of said projection from engagement with the projection on the switch-rod the spring surrounding said switch-rod will become effective to restore said switch-rod to its normal position and to close automatically the gap in the corresponding branch of the power circuit.

Figure 3:
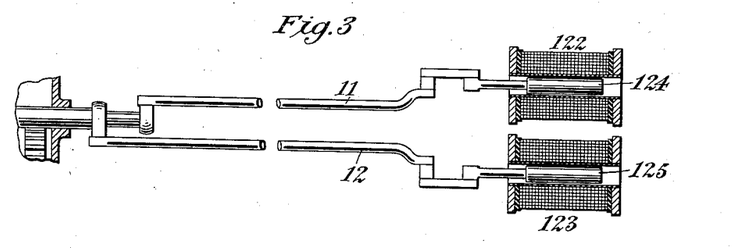
Fig. 3 is a sectional plan of the lower portion of the apparatus shown in Fig. 1, illustrating mainly the shifter-rods and the means for shifting them to their neutral positions, the section being taken in line 3—3, Fig. 1.

The reciprocating movement of each of the solenoid plungers before described is intended to be transmitted in this case to a reciprocating member or rod separate from said plungers, there being two of these rods shown in Fig. 2, one of which is operated by the plungers 19 and 20 and the other of which is operated by the plungers 21 and 22. These two reciprocating members are designated respectively by 117 and 118. They are mounted to slide in suitable guides, as, for instance, in an open frame member, 119, and each is unconnected with the plungers by which it is actuated. The construction is such that each rod 117 and 118 is intended to be shifted to one side or the other of the normal position shown in Figs. 1 and 2 by a hammer-like blow of said plunger, the direction to which it is shifted depending upon whether it is struck by the left-hand plunger or by the right-hand plunger. The movements of the reciprocating members 117 and 118 may in turn be transmitted to the gear-shifters or shifter-rods 11 and 12 in any desired manner, as for example, by pivoted shifting-levers, 120 and 121, connected with the members 117 and 118, as by pin-and-slot connections. At their lower ends the levers 120 and 121 are shown as connected directly to the outer ends of the gear-shifters 11 and 12. Thus through the action of the plungers 19 and 20 the reciprocating member 117 will be driven in one direction or the other to the right or to the left of its normal position to shift to either one of the speeds controlled by it and in a similar manner the plungers 21 and 22 though operated at different times drive the reciprocating member 118 to its extreme left-hand or right-hand position to effect one or the other of the two gear changes controlled by such movements. When in the normal position shown in Fig. 1 all of the connections from the shifting-levers 120 and 121 to the gears will be in the normal or neutral position. Here the four active or working positions are under the control of the four solenoids 15—18. The neutral position is, in this case, under the control of a pair of solenoids, 122 and 123, having plungers, 124 and 125, connected respectively with the free ends of the gear-shifters or shifter-rods 11 and 12. Each of these solenoids, as will be seen by referring to Fig. 3, is operative independently of the other for moving its shifter-rod to the normal or neutral position. The solenoids 122 and 123 suitably energized are shown in these views as the operating power devices for returning the parts to neutral position in order to illustrate how the well-known type of electrically-operated gear-shifting device may be employed for the neutral position in connection with my new type of operating power device normally under restraint and operative when released for effecting the working changes in the speed gearing. Of course, electrically energized springs normally held under compression may be employed instead of the solenoids 122 and 123 exactly as in connection with the gear changes for the different working positions and speeds. It will be understood of course that whichever type of operating power device is employed it will be governed by an electric circuit having a suitable circuit-controller therein.

Figure 4:
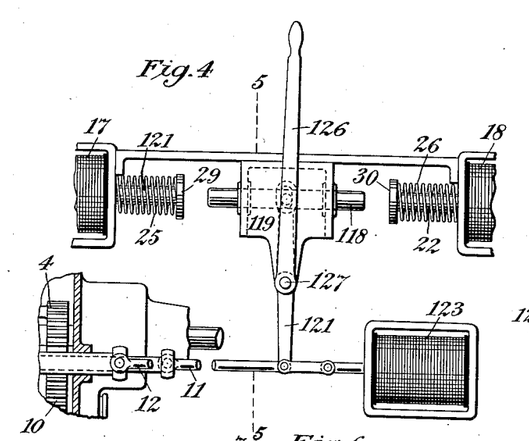
Fig. 4 is a side elevation of the major portion of the mechanism shown in Fig. 1, and illustrates both manual and power means for energizing the operating power devices.
Figure 5:
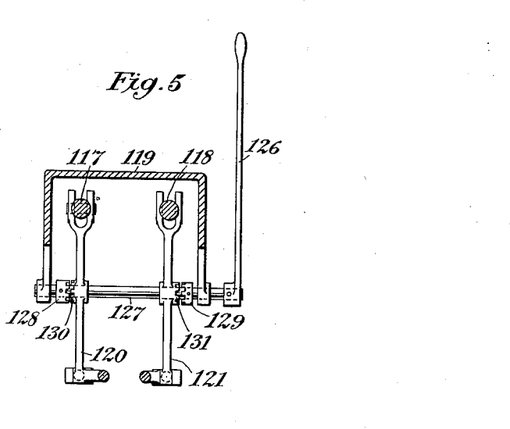
Fig. 5 is a vertical transverse section of the same, the section being taken in line 5—5, Fig. 4.

In addition to the power devices before described for supplying energy for effecting the desired gear-shifting movements, or as an auxiliary thereto, I may employ manual means for accomplishing the same results, that is to say, I may employ manual means for putting under compression the various operating springs 23—26 for shifting the gears to different working positions, and may also employ the same manual means for directly acting upon the gear-shifters or shifter-rods 11 and 12 to move them to the neutral position when desired. In Figs. 4 and 5 I have illustrated a hand-lever 126 for this purpose. It is shown as secured to the end of a rock-shaft, 127, mounted in bearings in the lower portion of the frame member 119, which shaft also passes through the hub portions of the power-operated shifting levers 120 and 121. The rock-shaft 127 is intended to slide back and forth in its bearings and is illustrated as having secured thereto a pair of oppositely-facing clutch members, 128, and 129, adapted to engage complementary clutch members 130 and 131, on the power operated shifting-levers 120 and 121. By shifting the manual lever 126 sidewise the rock-shaft 127 may be correspondingly moved endwise either to the neutral position shown in Fig. 5 or to a plurality of other positions corresponding to the working positions of the levers 120 and 121.

The selection of the desired gear-shifting operation, whether to a working position or to neutral position, will of course be determined by the operation of a push-button, such as 105, etc., or other suitable device. In the specific construction shown in Fig. 2 of course the circuit for releasing any of the operating springs will not actually be closed until the pedal 79 is depressed, but, as before shown, it is not necessary to employ an additional controlling break in the combined controlling and power circuit, or to govern such a break by the clutch-lever. Of course the neutralizing solenoids 122 and 123 may also be connected in circuit with the single source of energy 67. In case the source of energy or battery should fail the necessary gear-shifting operations both to neutral and working positions will of course be performed, in the apparatus illustrated, by manipulation of the lever 126 both lengthwise of its axis and about that axis.

Figure 6:
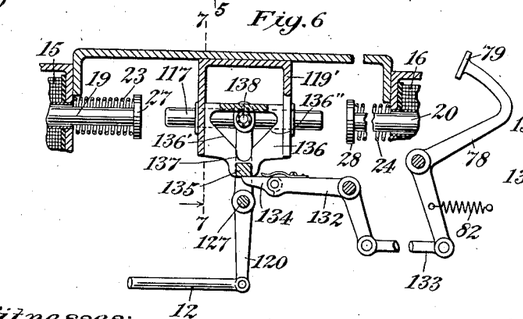
Fig. 6 is a vertical longitudinal section and elevation of a modification of said gear-shifting mechanism, illustrating manual means for mechanically restoring the shifter-rods to neutral position, the section being taken in line 6—6, Fig. 7.
Figure 7:
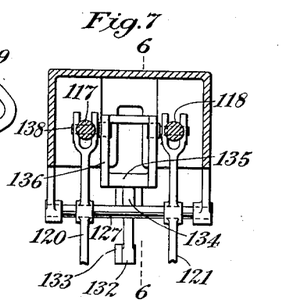
Fig. 7 is a vertical transverse section and elevation of the same, the section being taken in line 7—7, Fig. 6.

In Figs. 6 and 7 I have illustrated a modification of the invention in which the parts are in many respects the same as, or similar to, those shown in the other views, the energizing solenoids, the operating power devices or springs, the plungers, the reciprocatory member operated thereby, the power-operated shifting-levers, the gear-shifters or shifter rods, and the clutch-lever being the same as in the other views and designated by the same reference characters. Instead, however, of employing in this modification separate solenoids, such as 122 and 123, for returning the parts to neutral position I have illustrated mechanical devices for this purpose, which devices are operated by the clutch-lever 78. These connections here embody an angle-lever, 132, operated from the clutch-lever 78 through a connecting-rod, 133, and carrying at its free or working end a by-pass pawl, 134, adapted to engage the under side of a stop, 135, on a vertically reciprocatory cam, 136, mounted to slide in the frame member 119': This cam has two cam-faces, 136' and 136", and a locking notch, 137, between them, the parts being so combined as to coöperate with a projection, preferably an antifriction roller on the end of a pin, 138, on the power-operated shifting-lever 121, for the purpose of restoring said shifting-lever to its central or neutral position and with it the gears of the change-speed mechanism. The manner in which this is accomplished is well understood and will be obvious from the drawings.

What I claim is:

1. Gear-shifting mechanism, comprising in combination with shiftable gears, a plurality of separately-operative normally energized gear-shifting power devices, and means for releasing said power devices separately.

2. Gear-shifting mechanism, comprising, in combination with a set of interrelated speed-changing gears, a plurality of separately-operative normally energized power devices each operative for moving a gear from one position to another, and separate means for normally holding said respective power devices under restraint.

3. Gear-shifting mechanism, comprising, in combination with gearing embodying a plurality of gears each shiftable from one working position to another through neutral position, a plurality of separately-operative normally energized power devices each operative for moving a gear from one working position through neutral position to another working position, and separate means for normally holding said respective power devices under restraint.

4. Gear-shifting mechanism, comprising, in combination with a set of interrelated speed-changing gears, a plurality of separately-operative normally energized power devices each operative for moving a gear from one position to another, separate means for normally holding said respective power devices under restraint, and means for releasing said power devices separately.

5. Gear-shifting mechanism, comprising, in combination with a set of interrelated speed-changing gears, a plurality of separately-operative springs each operative for moving a gear from one position to another, and separate means for normally holding said respective springs under restraint.

6. Gear-shifting mechanism, comprising, in combination with gearing embodying a plurality of gears each shiftable from one working position to another through neutral position, a plurality of separately-operative springs each operative for moving a gear from one working position through neutral position to another working position, and separate means for normally holding said respective springs under restraint.

7. Gear-shifting mechanism, comprising, in combination with a set of interrelated speed-changing gears, a plurality of separately-operative normally energized power devices each operative for moving a gear from one position to another, separate means for normally holding said respective power devices under restraint, and electrical controlling means for releasing said power devices separately.

8. Gear-shifting mechanism, comprising, in combination with a set of interrelated speed-changing gears, a plurality of separately-operative springs each operative for moving a gear from one position to another, separate means for normally holding said respective springs under restraint, and electrical controlling means for releasing said springs separately.

9. Gear-shifting mechanism, comprising, in combination with a set of interrelated speed-changing gears, a plurality of operately-operative spring each operative for ating power devices separately operative for moving corresponding gears respectively each from one position to another, and separate means for energizing said operating power devices.

10. Gear-shifting mechanism, comprising, in combination with a set of interrelated speed-changing gears, a plurality of operating power devices separately operative for moving corresponding gears respectively each from one position to another, and a plurality of energizing power devices separately operative for energizing said respective operating power devices.

11. Gear-shifting mechanism, comprising, in combination with gearing embodying a plurality of gears each shiftable from one working position to another through neutral position, a plurality of operating power devices separately operative for moving corresponding gears respectively each from one working position through neutral position to another working position, and a plurality of energizing power devices separately operative for energizing said respective operating power devices.

12. Gear-shifting mechanism, comprising, in combination with a set of interrelated speed-changing gears, a plurality of operating power devices separately operative for moving corresponding gears respectively each from one position to another, a plurality of energizing power devices separately operative for energizing said respective operating power devices, means for maintaining each operating power device in its energized condition, and means for releasing separately said energized operating power devices.

13. Gear-shifting mechanism, comprising, in combination with gearing embodying a plurality of gears each shiftable from one working position to another through neutral position, a plurality of operating power devices of one character separately operative for moving corresponding gears respectively each from one working position to another, and separate energizing power devices of another character for energizing said respective operating power devices.

14. Gear-shifting mechanism, comprising, in combination with a set of interrelated speed-changing gears, a plurality of operating power devices separately operative for moving corresponding gears respectively each from one position to another, and separate electrical power devices for energizing said respective operating power devices separately.

15. Gear-shifting mechanism, comprising, in combination with a set of interrelated speed-changing gears, a plurality of operating power devices separately operative for moving corresponding gears respectively each from one position to another, and separately operative solenoids for energizing said respective operating power devices separately.

16. Gear-shifting mechanism, comprising, in combination with a set of interrelated speed-changing gears, a plurality of springs separately operative for moving corresponding gears respectively each from one position to another, and separately-operative electrical power devices for storing energy in said springs.

17. Gear-shifting mechanism, comprising, in combination with a set of interrelated speed-changing gears, a plurality of pairs of power devices the first device of each pair being operative for shifting a gear and the second device of each pair being operative for energizing the first, and separate controlling means for said respective energizing power devices.

18. Gear-shifting mechanism, comprising, in combination with a set of interrelated speed-changing gears, a plurality of pairs of power devices the first device of each pair being operative for shifting a gear and the second device of each pair being operative for energizing the first, and separate power-operated controllers for governing the action of said respective energizing power devices.

19. Gear-shifting mechanism, comprising, in combination with a set of interrelated speed-changing gears, a plurality of pairs of power devices the first device of each pair being operative for shifting a gear and the second device of each pair being operative for energizing the first, and separate controllers for said respective operating power devices.

20. Gear-shifting mechanism, comprising, means for supplying and applying power for shifting individual gears, and separately-operative devices for automatically determining the period of time that power is supplied for shifting each individual gear.

21. Gear-shifting mechanism, comprising, means for supplying and applying power for shifting individual gears, separate devices for starting the action of said power-supplying means for each gear, and separately-operative devices for automatically stopping each such action at a predetermined time after the starting of the same.

22. Gear-shifting mechanism, comprising, a plurality of separately-operative electrical devices for supplying power for bringing about the shifting of individual gears, means for separately energizing said electrical devices, and separately-operative automatic devices for deënergizing said electrical devices respectively.

23. Gear-shifting mechanism, comprising, a plurality of separately-operative electrical devices for supplying power for bringing about the shifting of individual gears, means for separately energizing said electrical devices, and separately-operative automatic devices each controlled by the action of a different one of said electrical devices for deënergizing that device at a predetermined moment after the beginning of its energization.

24. Gear-shifting mechanism, comprising, an electric circuit having a plurality of parallel branches each branch of which contains a device for supplying power for bringing about the shifting of one of a plurality of gears and also contains an automatic device for determining the period of said supply, and a manual circuit-controller governing all of said branches.

25. Gear-shifting mechanism, comprising, an electric circuit having a plurality of parallel branches each branch of which contains a solenoid for supplying power for bringing about the shifting of one of a plurality of gears, and a plurality of automatic devices each controlled by a different one of said branch-circuits and each operative for making its respective solenoid circuit on one stroke of the solenoid-plunger and for breaking said circuit on the other stroke of said plunger.

26. Gear-shifting mechanism, comprising, in combination with a set of interrelated speed-changing gears, a plurality of separately-operative pairs of power devices the first device of each pair being operative at one time for shifting a gear and the second device of each pair being operative at a different time for energizing the first.

27. Gear-shifting mechanism, comprising, in combination with a set of interrelated speed-changing gears, a plurality of separately operative pairs of power devices the first device of each pair being operative at one time for shifting a gear and the second device of each pair being operative at a different time and from a source of power of a different character for energizing the first.

28. Gear-shifting mechanism, comprising, in combination with a set of interrelated speed-changing gears, a plurality of separately-operative pairs of power devices the first device of each pair being operative at one time for shifting a gear and the second device of each pair being operative at a different time and for a relatively short period for energizing the first.

29. Gear-shifting mechanism, comprising, in combination with a set of interrelated speed-changing gears, a plurality of operating power devices separately operative for moving individual gears each from one position to another, and electrical means for effecting separately a substantially instantaneous energization of each of said operating power devices.

30. Gear-shifting mechanism, comprising, in combination with a set of interrelated speed-changing gears, a plurality of operating power devices separately operative for moving individual gears each from one position to another, electrical means for effecting separately a substantially instantaneous energization of each of said operating power devices, and a plurality of separate devices for maintaining said operating power devices respectively in their energized condition.

31. Gear-shifting mechanism, comprising, a plurality of separately-operative pairs of power devices the first device of each pair being operative at one time for shifting a gear and the second device of each pair being an electrical device operative at a different time for energizing the first, all of said electrical devices being connected in parallel branches of a common energizing circuit.

32. Gear-shifting mechanism, comprising, in combination with a set of interrelated speed-changing gears, a plurality of separately-operative pairs of power devices the first device of each pair being operative at one time for shifting a gear and the second device of each pair being a solenoid operative at a different time for energizing the first, and separately-operative devices for substantially instantaneously making and breaking the circuits of said respective solenoids.

33. Gear-shifting mechanism, comprising, a plurality of operating power devices separately operative for moving individual gears each from one position to another, and means for simultaneously energizing all of said operating power devices.

34. Gear-shifting mechanism, comprising, a plurality of operating power devices separately operative for moving individual gears each from one position to another, and power-operated means for bringing about the simultaneous energization of all of said operating power devices.

35. Gear-shifting mechanism, comprising, a plurality of operating power devices separately operative for moving individual gears each from one position to another, and electrical means for simultaneously energizing all of said operating power devices.

36. Gear-shifting mechanism, comprising, a plurality of operating power devices separately operative for moving individual gears each from one position to another, means for simultaneously energizing all of said operating power devices, and controlling means for releasing said power devices separately.

37. Gear-shifting mechanism, comprising, a plurality of operating power devices separately operative for moving individual gears each from one position to another, power-operated means for bringing about the simultaneous energization of all of said operating power devices, and manual controlling means for bringing about the release of said power devices separately.

38. Gear-shifting mechanism, comprising, a plurality of operating power devices separately operative for moving individual gears each from one position to another, means for simultaneously energizing all of said operating power devices, and separate devices for latching each of said energized operating power devices.

39. Gear-shifting mechanism, comprising, a plurality of operating power devices separately operative for moving each from one position to another, means for simultaneously energizing all of said operating power devices, separate devices for latching each of said energized operating power devices, and means for releasing said latching devices separately.

40. Gear-shifting mechanism, comprising gear-shifting means having a plurality of gear-shifting movements, a single power circuit having a plurality of parallel branches each including electrical means for supplying energy for bringing about one of said movements, and controlling means for releasing said energy.

41. Gear-shifting mechanism, comprising gear-shifting means having a plurality of gear-shifting movements, a single power circuit having a plurality of parallel branches each including electrical means for supplying energy for bringing about one of said movements, and a controlling circuit for releasing the energy of said electrical means.

42. Gear-shifting mechanism, comprising gear-shifting means having a plurality of gear-shifting movements, a single power circuit having a plurality of parallel branches each including electrical means for supplying energy for bringing about one of said movements, and a single controlling circuit having a plurality of parallel branches each including electrical means for releasing the energy stored by a corresponding branch of the power circuit.

43. Gear-shifting mechanism, comprising a power circuit having a plurality of parallel branches each containing an automatic circuit-controller for breaking said branch circuit at the end of a predetermined period and also including electrical means for supplying energy for bringing about the shifting of a gear from one position to another, and a controlling circuit for releasing said energy.

44. Gear-shifting mechanism, comprising a power circuit having a plurality of parallel branches each containing an automatic circuit-controller for breaking said branch circuit at the end of a predetermined period and also including electrical means for supplying energy for bringing about the shifting of a gear from one position to another, and a controlling circuit having a plurality of parallel branches each having an automatic circuit-controller governed by said electrical means.

45. Gear-shifting mechanism, comprising a power circuit having a plurality of parallel branches each containing an automatic circuit-controller for breaking said branch circuit at the end of a predetermined period and also including electrical means for supplying energy for bringing about shifting of a gear from one position to another, and a controlling circuit having a plurality of parallel branches, each branch of the power circuit and each branch of the controlling circuit having an automatic circuit-controller one of which is open when that of the corresponding branch circuit is closed.

46. Gear-shifting mechanism, comprising a plurality of springs for shifting corresponding gears, a power circuit having a plurality of parallel branches each including a solenoid for energizing a corresponding spring, and a controlling circuit having a plurality of parallel branches each including means for releasing a corresponding spring, each branch of the power circuit and each branch of the controlling circuit having an automatic circuit-controller and the controllers of corresponding branches of such circuits being opened and closed substantially reciprocally.

47. Gear-shifting mechanism, comprising a plurality of springs for shifting corresponding gears, a power circuit having a plurality of parallel branches each including a solenoid for energizing a corresponding spring, a controlling circuit having a plurality of parallel branches each including means for releasing a corresponding spring, and a plurality of double-throw switches operated respectively by said solenoid-plungers and each operative for opening a break in its branch of the power circuit and closing one in the corresponding branch of the controlling circuit on one stroke of its plunger and for closing said break in the power circuit and opening that in the controlling circuit on the other stroke of said plunger.

48. Gear-shifting mechanism, comprising a plurality of springs for shifting corresponding gears, a power circuit having a plurality of parallel branches each including a solenoid for energizing a corresponding spring, a controlling circuit having a plurality of parallel branches each including means for releasing a corresponding spring, a plurality of double-throw switches operated respectively by said solenoid-plungers and each operative for opening a break in its branch of the power circuit and closing one in the corresponding branch of the controlling circuit on one stroke of its plunger and for closing said break in the power circuit and opening that in the controlling circuit on the other stroke of said plunger, and a circuit-controller governing another break in the main line of each of said circuits and operative for closing them alternatively.

49. Gear-shifting mechanism, comprising a plurality of springs for shifting corresponding gears, a power circuit having a plurality of parallel branches each including a solenoid for energizing a corresponding spring, a controlling circuit having a plurality of parallel branches each including means for releasing a corresponding spring, a plurality of double-throw switches operated respectively by said solenoid-plungers and each operative for opening a break in its branch of the power circuit and closing one in the corresponding branch of the controlling circuit on one stroke of its plunger and for closing said break in the power circuit and opening that in the controlling circuit on the other stroke of said plunger, and a circuit-controller operated by the clutch-lever and governing another break in the main line of each of said circuits and operative for closing them alternatively and having means for normally moving it into position for closing said break in the main line of the power circuit.

50. Gear-shifting mechanism, comprising a plurality of operating power devices separately operative for moving individual gears each from one position to another, and a plurality of sets of energizing, latching and releasing power devices one set for each operating power device, the energizing devices of all sets being simultaneously operative and the latching devices of all sets being also simultaneously operative and the releasing devices of the different sets being separately operative.

51. Gear-shifting mechanism, comprising gear-shifting means having a plurality of gear-shifting movements, a plurality of operating power devices for effecting said movements respectively, and an electrical power circuit having a plurality of parallel branches each including means for energizing the corresponding operating power device.

52. Gear-shifting mechanism, comprising a gear-shifting element, and an operating power device normally under restraint and normally out of contact with said gear-shifting element and adapted when released to force the same to a new position.

53. Gear-shifting mechanism, comprising a gear-shifting element, and a spring-operated actuator normally under restraint and normally out of contact with said gear-shifting element and adapted when released to force the same to a new position.

54. Gear-shifting mechanism, comprising a gear-shifting element, and a plurality of operating power devices each normally under restraint and normally out of contact with said gear-shifting element and operative separately when released for forcing said gear-shifting element to one position or another.

55. Gear-shifting mechanism, comprising a gear-shifting element, a plurality of spring-operated actuators each normally under restraint and normally out of contact with said gear-shifting element, and operative separately when released for striking said gear-shifting element a sharp blow and driving it to one position or another.

56. Gear-shifting mechanism, comprising a gear-shifting element, an operating power device normally out of contact with said gear-shifting element and adapted when released to force the same to a new position, a power circuit embodying means for energizing said operating power device, and a controlling circuit for releasing said operating power device.

57. Gear-shifting mechanism, comprising a gear-shifting element, a plurality of spring-operated actuators each normally out of contact with said gear-shifting element and each adapted when released to strike said element a sharp blow and drive it to one of a plurality of new positions, a power circuit embodying means for simultaneously energizing all of said springs, and a controlling circuit embodying means for releasing said springs separately.

58. Gear-shifting mechanism, comprising, in combination with a gear, a spring for moving said gear from one position to another, a solenoid for energizing said spring, means for holding said energized spring under restraint, an automatic circuit-controller governing the circuit of said solenoid and movable to one circuit-controlling position by said solenoid, and a separate spring for moving said circuit-controller to its other circuit-controlling position.

59. Gear-shifting mechanism, comprising, in combination with a gear, a spring for moving said gear from one position to another, a solenoid for energizing said spring and having a plunger the out-stroke of which is derived from the power of said spring, means for holding said energized spring under restraint, an automatic circuit-controller governing the circuit of said solenoid and operative for opening a break in the solenoid circuit on the energization of said solenoid, and a separate spring for operating said circuit-controller to close said break in the solenoid circuit on the deënergization of said solenoid.

60. Gear-shifting mechanism, comprising, a relatively short power circuit of low resistance having a plurality of parallel branches each containing an automatic circuit-controller governing said branch and also containing electrical means for storing energy for shifting a gear from one position to another.

Signed at New Haven in the county of New Haven and State of Connecticut this 22d day of November, A. D. 1913.

CHARLES R. UNDERHILL.

Witnesses:
MARY A. MURPHY,
EVA M. VISEL.